United States Patent
Motzko et al.

[11] Patent Number: 5,926,584
[45] Date of Patent: Jul. 20, 1999

[54] FIBER OPTIC LOAD SENSOR

[76] Inventors: Friedrich Motzko, Riederwalsiedlung 25 D-86529; Jörg Plamper, Regensburger Str. 36 D-86529, both of Schrobenhausen, Germany

[21] Appl. No.: 08/713,820

[22] Filed: Sep. 13, 1996

[30] Foreign Application Priority Data

Sep. 15, 1995 [DE] Germany .............. 195 34 260

[51] Int. Cl.⁶ .................................. G02B 6/00
[52] U.S. Cl. ............. 385/13; 250/227.14; 250/227.16; 73/653
[58] Field of Search ................ 385/11–13; 250/227.14, 250/227.15, 227.16, 227.19; 73/653–657, 705

[56] References Cited

U.S. PATENT DOCUMENTS

| Re. 35,020 | 8/1995 | Quinlan, Jr. ................ 385/13 |
| 4,724,316 | 2/1988 | Morton ...................... 385/13 |
| 4,788,868 | 12/1988 | Wilk ......................... 73/800 |
| 4,794,365 | 12/1988 | Dunbar ...................... 338/99 |
| 5,317,929 | 6/1994 | Brown et al. ............... 73/653 |

FOREIGN PATENT DOCUMENTS

| 33 25 945 A1 | 2/1984 | Germany . |
| 43 04 545 A1 | 8/1994 | Germany . |
| 1 570 511 | 7/1980 | United Kingdom . |
| 2 125 572 | 3/1984 | United Kingdom . |
| 2 127 172 | 4/1984 | United Kingdom . |

OTHER PUBLICATIONS

J. Boby, et al., "Vehicle Weighing in Motion with Fibre Optic Sensors", *Measurement + Control*, vol. 26, Mar. 1993, pp. 45–47.

Tetsuji Abe, et al., "A Strain Sensor Using Twisted Optical Fibers", *Journal of Lightwave Technology*, vol. 7, No. 3, Mar. 1989, pp. 525–529.

Y. Ohtsuka, et al., "Polarimetric Fibre Coil Deformation Sensor Insensitive to Ambient Temperature Disturbances", *Measurement Science & Technology*, vol. 3, Apr. 1992, pp. 375–380.

*Primary Examiner*—Hemang Sanghavi
*Attorney, Agent, or Firm*—Blank Rome Comisky & McCauley LLP

[57] ABSTRACT

The invention concerns a faseroptic load sensor with a support structure and at least one interference structure shaped like a wire, on which at least one optical fiber is displayed. The optical fiber is cleared through a wireshaped interference structure at intervals from the support structure so that a large number of bent spots occur. An additional pressure load on the optical fiber vertical to the support structure then causes changes in the bending radius of each bend spot.

15 Claims, 2 Drawing Sheets

FIBER OPTIC LOAD SENSOR

FIELD OF THE INVENTION

The invention concerns a faseroptic load sensor with a support structure and at least one interference structure on which at least one optical fiber is displayed.

BACKGROUND OF THE INVENTION

Such a load sensor is, for example, known from DE 33 25 945 A1 and is based on the principle that forces affecting the side of the optical fiber lead to deformations of the corresponding fiber sections. In the case of the known structure, the optical fiber is displayed on a periodically [i.e., cyclically] shaped support structure so that, in the case of a load vertical to the fiber axis, a periodic deformation occurs. When the latter stands in correct proportion to the beat length of two of the modes contained in the optical fibers, the changes in pressure cause corresponding changes in the mode coupling. The known structure is, in other words, strongly dependent on the geometry of the support structure and, ultimately, on its coefficient of expansion in cases of temperature change. Constant interference is also caused by tensile strain, as for example, when such a sensor is laid in a road surface.

SUMMARY OF THE INVENTION

One of the objectives of the present invention is to create a faseroptic load sensor that is laid, in particular, in the road surface for the detection of vehicles, and which withstands well the mechanical and thermal loads that occur and is able detect the wheel of a vehicle driving over it with the lowest possible error rate. This objective is achieved according to the present invention by an optical load sensor in which an optical fiber is wound or spirally rolled about an elongate, substantially radially incompressible support structure so that the sensor is extensible. The fiber will undergo periodic bending moments along the longitudinal axis of the support structure, whereby light transmitted through the fiber is measurably attenuated by the deformations in the optical fiber attributable to the bending moments when the sensor is in its normal unloaded state, i.e., the optical fiber is already deformed, or pre-stressed, before any load to be measured is applied. Consequently, the sensor is much more sensitive to transverse loads produced by the vehicles traversing the road surface in which the sensor is embedded. Also, the sensor is less sensitive to longitudinal stress whether attributable to changes in ambient temperature of the roadbed or other factors.

While known load sensors generally detect the deformation of optical fibers in an essentially undeformed state, in the case of the load sensor according to the invention, a large number of distortions per unit of length are present in a no-load condition, whereby an additional pressure load causes changes in the respective bending radii, which in turn cause changes in the attenuation of the optical fibers.

BRIEF DESCRIPTION OF THE DRAWINGS

The invention will be described more closely in the following by using both a schematic representation based on the function principle and two working examples.

DETAILED DESCRIPTION

Figure 1:
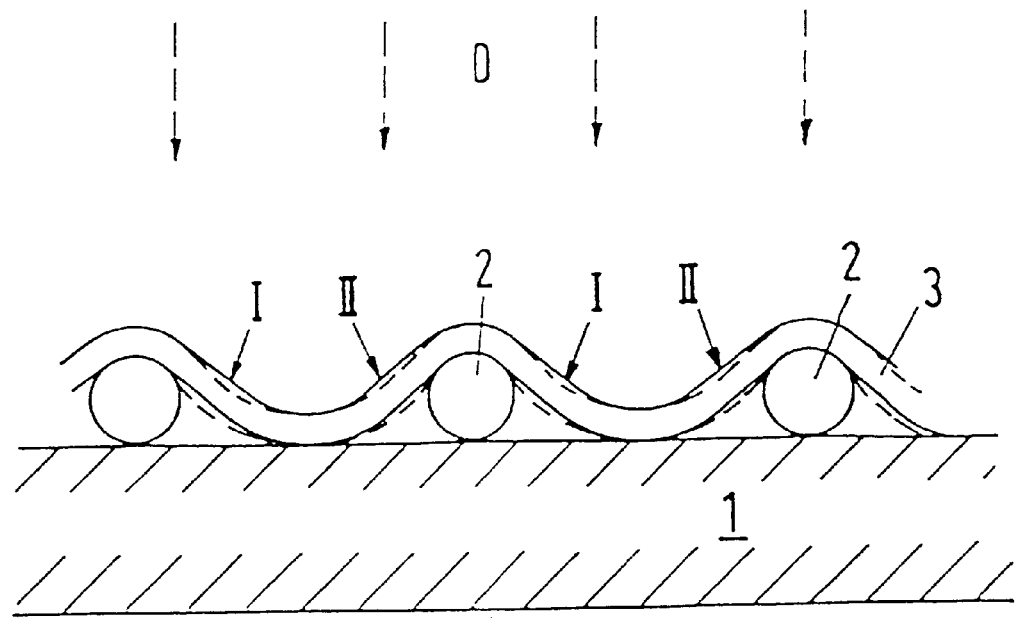
FIG. 1 shows the schematic construction of a faseroptic load sensor.

The basic construction of a load sensor according to the invention in accordance with FIG. 1 displays a support structure (1) with a smooth surface, an interference structure (2) shaped like a wire set up on top of it, and an optical fiber (3), which is spaced by the interference structure (2) at intervals from the support structure in such a way that two areas I and II, in which the fiber optic light guide is not supported, arise between two such elevations. The interference structure can also be designed like a bump of a support structure that is the same in all other ways. In the example represented in the diagram, the diameter of the structure shaped like a wire (2) is about twice the size of the diameter of the optical fiber (3): the interval between two neighboring elevations of the optical fibers (3) and the support structure (1) corresponds to about eight times the diameter of the optical fiber (3). As a result of this, the optical fiber is deformed almost up to the physically given limits of its bending radii even in the load sensor's normal condition. An additional load that affects the surface of the support structure (1) vertically, for example in the form of a pressure load (D), which is symbolized by the broken arrows, will further bend the optical fibers in the areas I and II, whereby these changes in the bending radius cause changes in the intensity of the light contained in the optical fibers.

Changes of length caused by temperature or a tensile strain of the support structure (1) will only be transferred to the optical fibers (3) to a small extent so that such interferences influence the sensitivity of the load sensor or the measuring signal only marginally.

Figure 2:
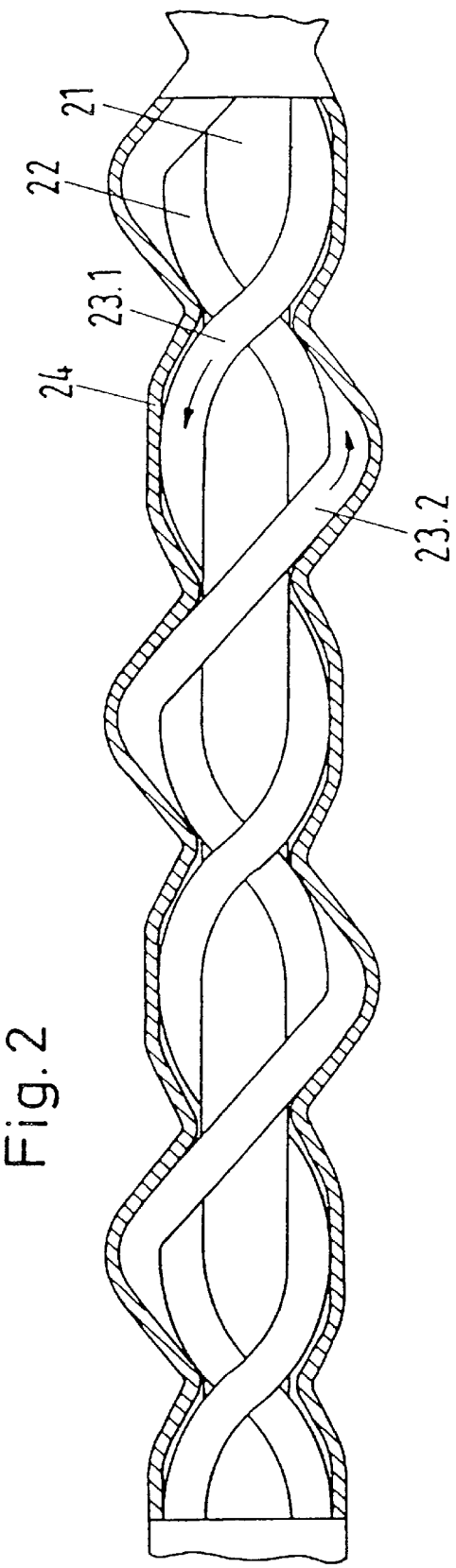
FIGS. 2 and 3 show two forms of load sensors shaped like a rope.

In the case of the embodiment of a load sensor shaped like a rope represented in FIG. 2, the support structure consists of a plastic core (21), on which a metal wire or a quartz fiber (22) is rolled up in twists with a steep slope as an interference structure. On this support and interference structure shaped as a rope, a first optical fiber (23.1) is wound in a wrapping, also with a steep slope, that is made into an interference structure (22) that works in the opposite direction. Around this rope designed as a support structure (21), interference structure (22), and first fiber optic light guide (23.1), a second optical fiber (23.2), in which the light is fed in the opposite direction to the optical fiber (23.1), is wound in the same direction as the first optical fiber (23.1). The optical fibers (23.1) and (23.2) are connected optically on one end of the rope or formed as a loop of an uninterrupted optical fiber so that the light supply and the evaluation of the signal can occur on the same end of the rope.

By winding the interference structure and fiber optic light guides in the opposite direction, they are cleared at periodic intervals, i.e., at each point of intersection of the wrappings of the plastic core (21), which represents the wrapping core. The slope of the wrappings determines the intervals of the elevations. The intersection points are either distributed linearly or helically on or around the plastic core (21), depending on the relationship of the slope of individual wrappings with respect to each other so that the entire load sensor displays an essentially radially symmetric sensitivity to outside sources of pressure.

The shrinkdown plastic tubing (24) leads to an initial tension of the optical fiber in the direction of the surface of the core, whose consequence is a decrease in the light transmitted from the fiber. Each additional radial load from outside leads immediately to another further elastic deformation of the optical fiber and thus to a reversible further drop in the light transmitted, which is detected as a measuring signal.

The wrapping intervals of the interference structure (2) are at least twice the diameter of the optical fiber (3) or the interference structure (2) depending on which of them is larger. The upper limit for the twisting intervals is relatively uncritical, but should not be exceeded by ten times the above-mentioned diameter. Also uncritical is the twisting interval of the optical fibers (23.1 or 23.2); the radial pressure sensitivity nonetheless improves as the wrapping interval becomes smaller. The diameter of the plastic core (21) is uncritical as well; favorable values lie at around two to ten times that of the diameter of the fiber optic light guide. Furthermore, it has proven beneficial when the interference structure (2) and the optical fiber (3) have about the same diameter.

Figure 3:
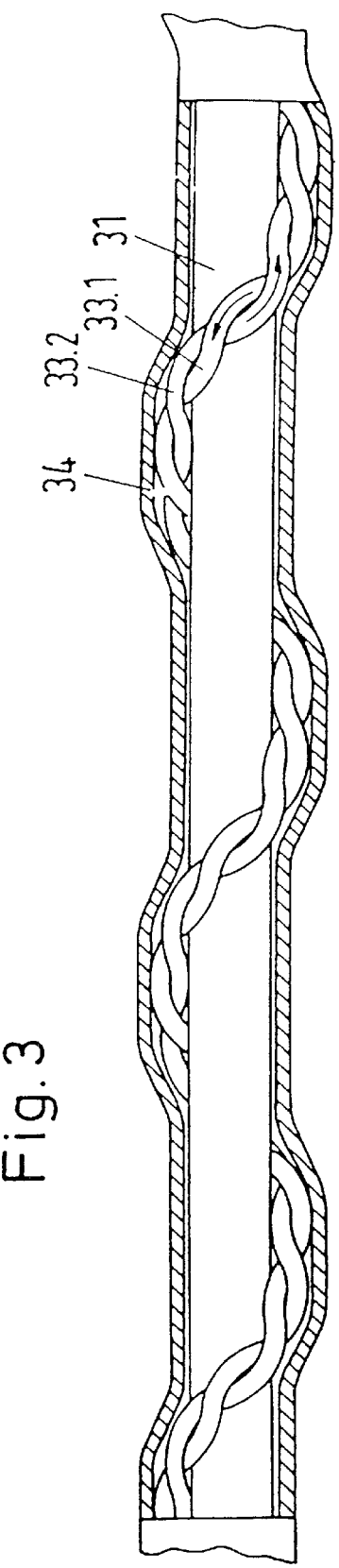

In the working example of a load sensor represented in FIG. 3, two optical fibers (33.1 and 33.2) made of quartz fiber are twisted with one another and wound together around a plastic core (31). In this embodiment, the optical fibers mutually take on the function of the interference structure in accordance with FIG. 2 so that one can do without an interference structure. The two optical fibers (33.1 and 33.2) are optically connected to each other on one end of the load sensor, which, for instance, is also caused by a loop formation and feedback of a single fiber optic light guide. The plastic core (31) consists of a flexible, but hard, material and is enclosed, together with the fiber optic light guides (33.1 and 33.2), by the shrinkdown plastic tubing (34).

Figure 4:
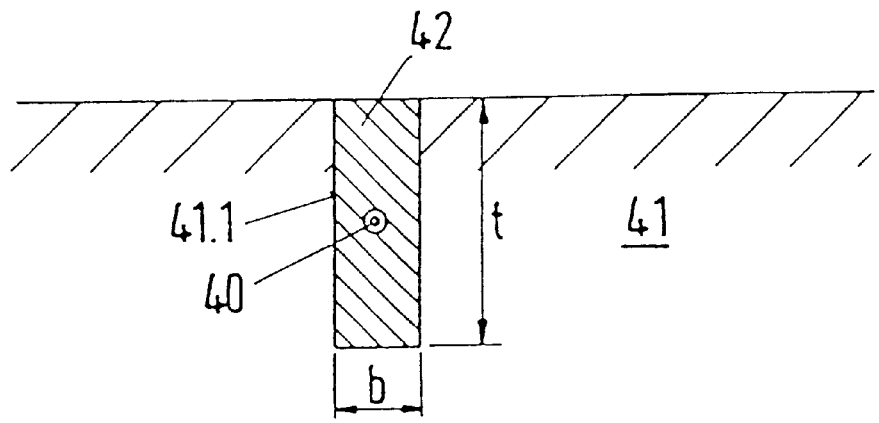
FIG. 4 shows a section through a road surface with the load sensor laid into it.

For the detection of vehicles and airplanes, a load sensor according to the invention, for example in accordance with the embodiments of FIGS. 2 or 3, is inserted in the desired position in the road surface. For a guaranteed, trouble-free detection of a wheel rolling by, embedding a faseroptic load sensor (40), represented in FIG. 4, in a slit (41.1) of the road surface (41) has proven itself with an elastic sealing compound (42) surrounding it. The depth (t) of the slit (41.1) stands in a 3-to-1 ratio to its width (b).

We claim:

1. An optical load sensor having an elongate configuration for placement in a road surface in a plane substantially parallel to the road surface to detect vehicles traversing the road surface by sensing the load exerted by each such vehicle on the sensor as a force applied transversely to the longitudinal axis thereof, the sensor having at least one optical fiber mounted on a hard support structure having said longitudinal axis so that said at least one optical fiber will undergo deformation and resultant measurable attenuation of light transmitted through the fiber in response to a said transverse force, said sensor further characterized by said optical fiber being spirally wound on the support structure and sharing the longitudinal axis thereof to allow some longitudinal elasticity of the sensor, and means producing spaced apart deformations of said optical fiber along the longitudinal axis thereof when no load is present to exert a said transverse force, whereby said optical fiber is deformed prior to performing any load measuring function to enhance the sensitivity of the sensor to transverse loads attributable to vehicles traversing the road surface by increasing the light transmissive sensitivity of the optical fiber in response to such loads.

2. The optical load sensor of claim 1, wherein said means for producing spaced apart deformations of the optical fiber comprises a second optical fiber mounted on said support structure for periodic interference with the support offered to the first-mentioned optical fiber by the support structure alone, whereby to establish said spaced apart deformations.

3. The optical load sensor of claim 2, wherein said first-mentioned and second optical fibers are coupled at one end of each for transmission of light through one optical fiber in one direction along said longitudinal axis and through the other optical fiber in the opposite direction along said longitudinal axis.

4. The optical load sensor of claim 3, wherein the first-mentioned and second optical fibers are part of one and the same optical fiber arranged so that its two ends are proximate one another with one end adapted to receive light from a source thereof and the other end adapted to enable measurement of light emanating therefrom.

5. The optical load sensor of claim 4, wherein said support structure comprises a hard plastic core which is resistant to said transverse forces.

6. The optical load sensor of claim 5, further including a protective sheath covering the combined optical fiber and plastic core, and producing a radial initial stress thereon.

7. The optical load sensor of claim 6, wherein the sensor is dimensioned to be embedded in the road surface in an opening therein having a depth equal to about three times its width and filled with an elastic sealing compound.

8. A process for detecting vehicles traversing a road surface by sensing t he load exerted by each such vehicle as a force applied transversely to the longitudinal axis of an optical load sensor of elongate configuration placed in the road surface in a plane substantially parallel there to, including configuring the sensor with at least one optical fibers spirally wound on a bard support structure sharing said longitudinal axis, so as to allow said at least one optical fiber to undergo deformation and resultant measurable attenuation change in the transmissivity of light through the fiber in proportion to a transverse force thereon, and providing spaced apart deformations of said optical fiber along the longitudinal axis thereof when no load is present to exert a transverse force on the fiber, whereby said optical fiber is deformed prior to performing any load measuring function, to enhance the sensitivity of the sensor to transverse loads attributable to vehicles traversing the road surface, by enhancing the light transmissive sensitivity of said optical fiber to such loads.

9. The process of claim 8, wherein the step of providing spaced apart deformations of the optical fiber is performed by spirally winding a second optical fiber about and along said support structure for periodic interference with the hard support offered to the first-mentioned optical fiber by the support structure alone.

10. The process of claim 9, including coupling said first-mentioned and second optical fibers at one end of each for transmission of light through one optical fiber in one direction along said longitudinal axis and through the other optical fiber in the opposite direction along said longitudinal axis.

11. The process of claim 10, including using one and the same optical fiber as the first-mentioned and second optical fibers, arranged so that its two ends are proximate one another with one end adapted to receive light from a source thereof and the other end adapted to enable measurement of light emanating therefrom.

12. The process of claim 11, wherein said support structure includes a hard plastic core resistant to said transverse forces.

13. The process of claim 12, including covering the combined optical fiber and plastic core with a protective sheath offering radial initial stress on the sensor.

14. The process of claim 13, including embedding the sensor in an opening in the road surface whose depth is equal to about three times its width, and filled the remaining space in the opening with an elastic sealing compound.

15. An optical load sensor adapted to be embedded in a road surface in a plane substantially parallel to said surface to detect loads transmitted onto the sensor transversely to said plane by a vehicle on the road surface in proximity to the sensor, the sensor comprising an elongate support structure having a longitudinal axis, a light guide rolled in spiral manner on and along the length of the support structure in one direction about the longitudinal axis thereof and back in the opposite direction on and along the support structure to periodically engage the light guide portion wound in the one direction whereby to produce periodic bending moments and resulting deformations of the light guide in a normal unloaded state of the sensor in the absence of said loads and an enhanced sensitivity of the sensor to detect said transverse loads, a source of light at one end of the light guide for transmission in said one direction and back in said opposite direction therethrough for collection at the other end thereof with measurable attenuation by pre-deformations thereof and added deformation resulting from the transverse loads applied by vehicles traversing the road surface, the support structure having sufficient hardness to support the light guide when transverse loads are applied to the sensor.

* * * * *